United States Patent [19]

Echigo et al.

[11] Patent Number: 4,769,180
[45] Date of Patent: Sep. 6, 1988

[54] PROCESS FOR SEPARATELY RECOVERING URANIUM AND HYDROFLUORIC ACID FROM WASTE LIQUOR CONTAINING URANIUM AND FLUORINE

[75] Inventors: Yoshiaki Echigo; Hirotaka Amimoto; Mutsunori Yamao; Tadashi Ishikura, all of Uji; Keiichiro Otomura, Kurayoshi; Sakae Fujisaki, Okayama; Yoshikazu Ogura, Kurayoshi, all of Japan

[73] Assignee: Doryokuro Kakunenryo Kaihatsu Jigyodan, Tokyo, Japan

[21] Appl. No.: 32,588

[22] Filed: Apr. 1, 1987

[30] Foreign Application Priority Data

Apr. 4, 1986 [JP] Japan .................................. 61-78468

[51] Int. Cl.$^4$ .............................................. C01G 43/00
[52] U.S. Cl. .................... 252/631; 252/632; 210/682; 423/7; 423/8; 423/11; 423/12; 423/18
[58] Field of Search ............... 423/11, 12, 18, 7, 8; 252/631, 632; 210/682

[56] References Cited

U.S. PATENT DOCUMENTS

| | | | |
|---|---|---|---|
| 2,873,165 | 2/1959 | Bailes et al. | 423/12 |
| 3,842,155 | 10/1974 | Muller et al. | 423/11 |
| 3,937,783 | 2/1976 | Wamser et al. | 423/11 |
| 3,961,027 | 6/1976 | Crossley | 423/11 |
| 3,980,757 | 9/1976 | Dokuzogua | 423/11 |
| 4,234,555 | 11/1980 | Pulley et al. | 423/11 |
| 4,269,706 | 5/1981 | Sondermann | 423/11 |
| 4,412,861 | 11/1983 | Kreuzmann | 423/18 |
| 4,469,629 | 9/1984 | Vanderelde et al. | 252/631 |
| 4,501,691 | 2/1985 | Tanaka et al. | 252/631 |

Primary Examiner—Edward A. Miller
Attorney, Agent, or Firm—Wenderoth, Lind & Ponack

[57] ABSTRACT

A process for separately recovering uranium and hydrofluoric acid from a waste liquor containing uranium and fluorine comprises a neutralizing precipitation step wherein a magnesium compound is added to the waste liquor containing uranium and fluorine to form a precipitate and the thus formed precipitate is then separated; a distillation step wherein an aqueous solution of sulfuric acid is added to the precipitate separated in said neutralizing precipitation step to dissolve the precipitate and the thus formed solution is then distilled to recover hydrofluoric acid as a distillate; and a uranium recovery step wherein uranium is recovered from a residue produced by said distillation step.

7 Claims, 2 Drawing Sheets

FIG. I

PROCESS FOR SEPARATELY RECOVERING URANIUM AND HYDROFLUORIC ACID FROM WASTE LIQUOR CONTAINING URANIUM AND FLUORINE

BACKGROUND OF THE INVENTION

This invention relates to a process for recovering uranium and hydrofluoric acid from a waste liquor containing uranium and fluorine. More particularly, it relates to a process for efficiently and separately recovering uranium and fluorine from a waste liquor produced in a step of converting natural or depleted uranium into uranium hexafluoride or in a step of reconverting uranium hexafluoride from enriched or depleted uranium into uranium oxide.

Conventional processes for refining uranium may be broadly classified into dry and wet ones. Although the dry process produces little waste liquor, it costs a great deal since it requires a complicated apparatus and delicate temperature control. One the other hand, the wet process involves reactions which can proceed uniformly. Thus it can be readily carried out with a simple apparatus without any trouble of corrosion. However the principle of the wet process makes it unavoidable that a large amount of waste liquor is produced thereby. The waste liquor frequently contains uranium and fluorine. For example, in the case of a PNC process comprising the procedures as shown in FIG. 1 (see Journal of the Mining and Metallurgical Institute of Japan, 99,523(1983)), an aqueous solution of uranous chloride produced by electrolytic reduction is reacted with hydrofluoric acid in a fluorinating precipitation step, and the reaction product, i.e., uranium tetrafluoride crystals, is drawn from an outlet at the bottom of a reaction tank as a thick slurry, while the waste liquor containing uranium and fluoride is produced as an overflow solution from the top of the tank.

This waste liquor containing uranium and fluorine should be treated and discharged. A conventional method therefor is solid-liquid separation by neutralizing precipitation with the use of slaked lime.

However a cake, which is obtained by the above-mentioned solid-liquid separation by neutralizing precipitation with the use of slaked lime and mainly comprises calcium fluoride, contains radioactive uranium compounds. Therefore, this cake should be sealed in a drum and stored as a radioactive solid waste. Furthermore there is another problem that, if sulfate ion is contained in the waste liquor, the slaked lime would react with the sulfate ion to form a large amount of water-insoluble gypsum in the precipitation step, which brings about an extremely large increase in the amount of the cake to be stored.

SUMMARY OF THE INVENTION

Under these circumstances, an object of the present invention is to provide a process for treating a waste liquor containing uranium and fluorine by which substantially no solid waste is generated.

Another object of the present invention is to provide a process for efficiently and separately recovering uranium and hydrofluoric acid from a waste liquor containing uranium and fluorine.

We have found that these objects can be achieved by combining the solid-liquid separation by neutralizing precipitation using magnesium compound, the recovery of hydrofluoric acid by distillation and the recovery of uranium from the distillation residue.

Namely, a process for separately recovering uranium and hydrofluoric acid from a waste liquor containing uranium and fluorine according to the invention comprises a neutralizing precipitation step wherein a magnesium compound is added to the waste liquor containing uranium and fluorine to form a precipitate and the thus formed precipitate is then separated; a distillation step wherein an aqueous solution of sulfuric acid is added to the precipitate separated in said neutralizing precipitation step to dissolve the precipitate and the thus formed solution is then distilled to recover hydrofluoric acid as a distillate; and a uranium recovery step wherein uranium is recovered from a residue produced by said distillation step.

In the neutralizing precipitation step, an acid or an alkali may be added to the waste liquor, if necessary, to adjust the pH value of the liquor to 6 to 9 so as to effectively form the precipitate.

DETAILED DESCRIPTION OF THE INVENTION

Figure 1:
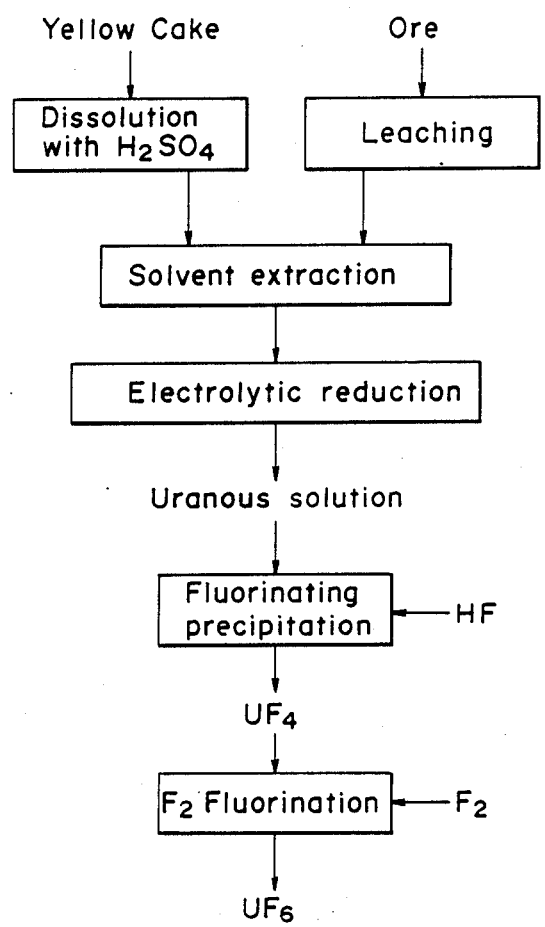
FIG. 1 is a block diagram showing the steps of a conventional PNC process for refining uranium.

The waste liquor to which the process of the present invention is to be applied may be those obtained by various wet uranium refining processes, so long as it contains uranium and fluorine. An overflow solution from the reaction tank used in the fluorinating precipitation of the wet process as shown in FIG. 1 is particularly preferable.

Figure 2:
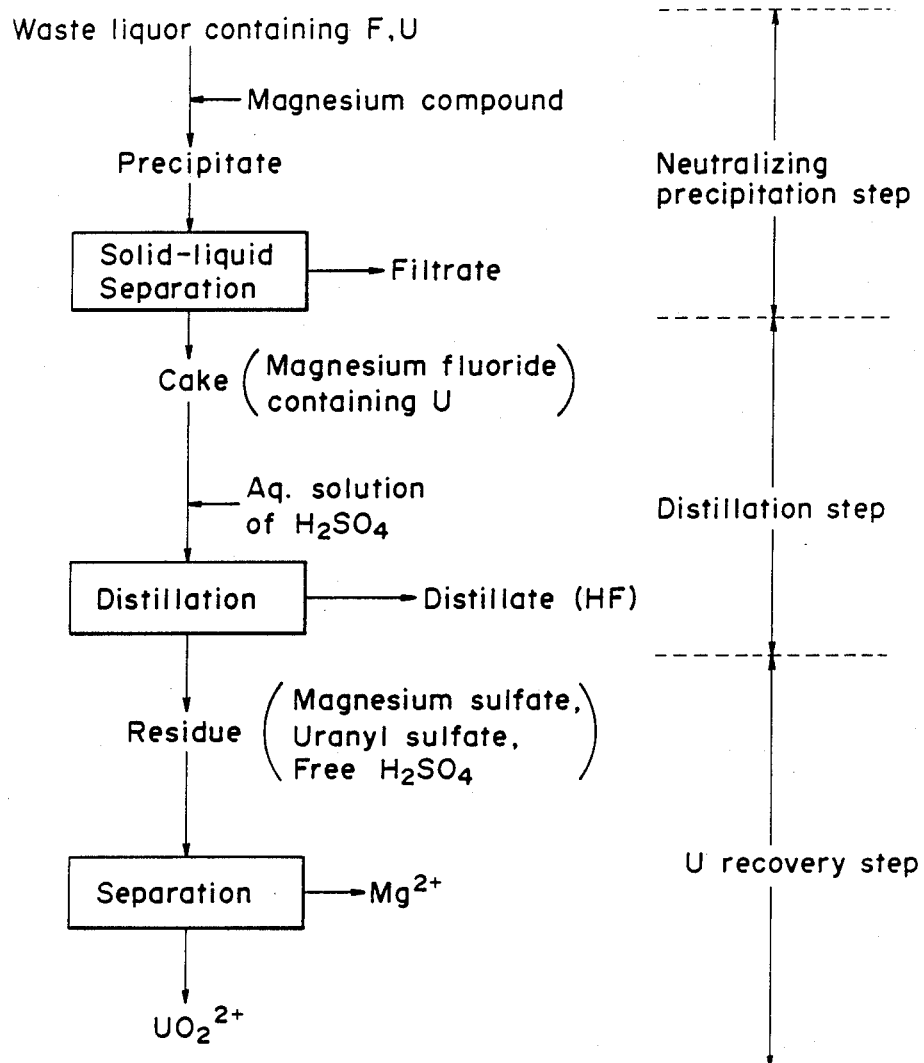
FIG. 2 is a block diagram showing a principle of the process of the present invention.

To such a waste liquor is added a magnesium compound in a neutralizing precipitation step of the process of the present invention as shown in FIG. 2. Preferable examples of the magnesium compound to be employed are $MgCl_2$, $MgSO_4$, $Mg(OH)_2$, $MgO$ and mixtures thereof. The magnesium compound may be preferably added to the waste liquor in an amount of one to ten times by equivalent, still preferably two to four times by equivalent, to the fluorine ion contained in the waste liquor.

If the pH value of the waste liquor is more than 9 or less than 6 after the magnesium compound is added, then an acid or an alkali is added to adjust the pH value of the waste liquor to about 6 to 9. Preferable examples of the acid and alkali to be added for controlling the pH value are sulfuric or hydrochloric acid and KOH or NaOH, respectively. In this neutralizing precipitation step, most of the uranium and fluorine in the waste liquor are fixed as a precipitate. The precipitate may be separated by a conventional solid-liquid separation technique such as a filter press. The cake obtained by the solid-liquid separation mainly comprises magnesium fluoride containing uranium and usually contains 60 to 70% by weight of water.

In the process of the present invention, an aqueous solution of sulfuric acid is added to the cake to thereby liberate hydrofluoric acid, which is then recovered through distillation in a distillation step. The sulfuric acid may be preferably added in an amount of one to five times by equivalent, still preferably two to three times by equivalent, to the $MgF_2$ contained in the cake. It is preferable that the aqueous solution of sulfuric acid to be added has a sulfuric concentration of approximately 20 to 98% by weight. By using the aqueous solution of sulfuric acid having such a concentration, an aqueous solution of hydrofluoric acid having the concentration of 3 to 5% by weight can be recovered as a distillate, which can be effectively reused in the wet uranium refining process as shown in FIG. 1. The distillation may be carried out by any well-known manner such as single distillation, multi-step distillation, batch distillation or continuous distillation under reduced or atmospheric pressure.

During the distillation step, a slurry containing magnesium sulfate, uranyl sulfate and free sulfuric acid is produced as a residue. A homogenous solution can be obtained by adding water to this residual slurry to give a uranium concentration of 20 to 50 g/l. From the thus obtained solution, uranium can be recovered in a pure state by adding an alkali to the solution to adjust the pH valve thereof to 1 to 2; and separating the uranium and magnesium contained in the solution by a conventional method such as, for example, adsorption using a strongly basic ion exchange resin or solvent extraction using trialkylamine.

EXAMPLE

To further illustrate the present invention, the following Example will be given wherein an overflow solution obtained from the fluorinating precipitation step in the wet uranium conversion process as shown in FIG. 1 is used as a waste liquor to be treated.

Neutralizing Precipitation Step 100 g of magnesium oxide was added to 10 l of the waste liquor, i.e. overflow solution, containing 3 g/l of hydrofluoric acid, 3 g/l of uranyl ion and 30 g/l of sulfuric acid. Then a 48% by weight aqueous solution of NaOH was added thereto to adjust the pH value of the same to 6.5. Thus a precipitate of magneisum fluoride containing uranium was formed. By filtering the solution containing the precipitate with a filter press, 27.2 g of a cake of magnesium fluoride containing uranium and 9.5 l of a filtrate were obtained.

The filtrate contained 50 mg/l of fluorine ion and 21 mg/l of uranyl ion. Thus more than 98% of the uranium and fluorine contained in the waste liquor were fixed as the precipitate. The cake containing uranium and fluorine obtained in the solid-liquid separation contained 56% by weight of water. The filtrate produced in this step, which mainly contained magnesium sulfate and sodium sulfate, was treated to lower the concentrations thereof below the levels defined by the regulation under the law by a conventional method such as, for example, adsorption with an ion exchange resin or precipitation, and then discharged into a river.

Distillation Step 290 g of a 60% by weight aqueous solution of sulfuric acid was added to 155 g of the cake of magnesium fluoride containing uranium obtained from the neutralizing precipitation step to thereby dissolve the cake. The thus obtained solution was distilled at a distillation temperature (vapor temperature) of 90° to 100° C. under a distillation pressure of 760 mmHg. Thus 158 ml of a 17.9% by weight aqueous solution of hydrofluoric acid was recovered as a distillate. Then water was added to the distillation residue to recover 1.0 l of an aqueous solution of the residue. This aqueous solution contained 104 g/l of free sulfuric acid, 17 g/l of magnesium ion, 27.2 g/l of uranyl ion and little hydrofluoric acid.

The above-described experiment obviously suggests that the fluorine and uranium contained in the waste liquor were completely separated in this distillation step. The 17.9% by weight aqueous solution of hydrofluoric acid recovered in this step can be effectively reused in the fluorinating precipitation in the wet uranium conversion process.

Uranium Recovery Step

To the aqueous solution of the residue obtained in the distillation step was added sodium hydroxide to form an aqueous solution of pH 2. 1.3 l of the thus formed aqueous solution was passed through a column packed with 400 ml of a strongly basic anion exchange resin ("DIAION SA 11A", a product manufactured by Mitsubishi Chemical Industries, Ltd.) at a space velocity of 2 $hr^{-1}$. After the completion of the passage, the resulting effluent contained 197 mg/l of uranyl ion and 13 g/l of magneisum ion. Therefore, more than 99% of the uranium contained in the starting waste liquor was selectively adsorbed by the anion exchange resin and thus the uranyl and magnesium ions were effectively separated. Since the effluent passed through the column contains little uranium it can be discharged into a river after conventionally well-known elaborate treatment.

The uranyl ion adsorbed by the anion exchange resin can be eluated by passing a 6 to 7N aqueous solution of sulfuric acid or a 0.5 to 1.5N aqueous solution of hydrochloric acid through the resin. Thus an aqueous solution of uranyl ion having the concentration of 20 to 60 g/l can be recovered as an eluate, which can be effectively reused as a raw material in the wet uranium conversion process.

As described hereinbefore, the process of the present invention comprises a combination of a neutralizing precipitation step wherein magnesium compound is used to produce a precipitate, a distillation step wherein sulfuric acid is used to dissolve the precipitate and hydrofluoric acid is recovered as a distillate, and a uranium recovery step wherein the uranium is recovered from the distillation residue. Thus, as compared with a conventional process using calcium compound in the neutralizing precipitation step, it is possible to produce substantially no cake to be stored in a drum as a radioactive solid waste. It is further advantageous in that the expensive hydrofluoric acid and uranium can be effectively recovered from a waste liquor and reused, which brings about a reduction in the raw material cost.

What is claimed is:

1. A process for separately recovering uranium and hydrofluoric acid from a waste liquor containing uranium and fluorine substantially without formation of solid waste upon completion of said process, said process comprising:

adding a magnesium compound to the waste liquor to form a precipitate of magnesium fluoride containing uranium;

separating the thus formed precipitate from the waste liquor;

adding an aqueous solution of sulfuric acid to the separated precipitate to dissolve it to thereby form a solution of the precipitate;

subjecting the solution of the precipitate to distillation to recover HF as a distillate and to produce a residue in the form of a slurry containing magnesium sulfate, uranyl sulfate and free sulfuric acid;

adding water to said residue to form an aqueous solution of the residue; and recovering uranium from the aqueous solution of the residue by adsorption with a strongly basic ion exchange resin or solvent extraction.

2. The process according to claim 1, which further comprises adding an acid or an alkali to the waste liquor in addition to the magnesium compound to thereby adjust the pH value of the waste liquor to 6 to 9.

3. The process according to claim 1, which further comprises adding said magnesium compound to the waste liquor in an amount of one to ten equivalents per equivalent of fluorine ion contained in said waste liquor.

4. The process according to claim 1, wherein said magnesium compound is selected from the group consisting of $MgCl_2$, $MgSO_4$, $Mg(OH)_2$, MgO and mixtures thereof.

5. The process according to claim 1, wherein said aqueous solution of sulfuric acid has a sulfuric acid concentration of about 20 to 98% by weight.

6. The process according to claim 1, which further comprises adding said sulfuric acid in an amount of one to five equivalents per equivalent magnesium fluoride contained in said precipitate.

7. The process according to claim 1, which further comprises:

adding an alkali to said aqueous solution of the residue to adjust the pH value of said aqueous solution to 1 to 2;

then contacting said aqueous solution of the residue with the strongly basic ion exchange resin to selectively adsorb uranyl ion in said aqueous solution of the residue by said resin and eluting the uranyl ion adsorbed by the resin with an aqueous solution of sulfuric acid or an aqueous solution of hydrochloric acid.

* * * * *